United States Patent [19]
Ho et al.

[11] Patent Number: 5,406,734
[45] Date of Patent: Apr. 18, 1995

[54] ELECTRIC SHOCK TYPE FISHING GEAR

[76] Inventors: Yi-Der Ho; Yih-Zhang Ho, both of 4/F., No. 115, Kung-Cheng Rd., Taichung City; Mei-Ching Pau, 3/F., No. 3, Lane 246, Sec. 4, Pa-Teh Rd., Taipei City; Ching-Chyuan Yang, No. 15, Lane 3, Hao-Chin Rd., Nan-Hsin Tsun, Fu-Yen Hsiang, Changhua Hsien, all of Taiwan, Prov. of China

[21] Appl. No.: 176,252
[22] Filed: Jan. 3, 1994
[51] Int. Cl.6 ............................................. A01K 85/00
[52] U.S. Cl. ....................................................... 43/17.1
[58] Field of Search ........................................... 43/17.1

[56] References Cited
U.S. PATENT DOCUMENTS

| | | | |
|---|---|---|---|
| 1,838,981 | 12/1931 | Anderson | 43/17.1 |
| 3,083,491 | 4/1963 | Meysan | 43/17.1 |
| 3,324,589 | 6/1967 | Makino | 43/17.1 |
| 3,382,598 | 5/1968 | Wilson | 43/17.1 |
| 3,416,254 | 12/1968 | Bornzin | 43/17.1 |
| 3,452,467 | 7/1969 | Makino | 43/17.1 |
| 4,627,187 | 12/1986 | Wilhams | 43/17.1 |
| 5,259,139 | 11/1993 | Ho | 43/17.1 |

FOREIGN PATENT DOCUMENTS

| | | | |
|---|---|---|---|
| 666621 | 10/1929 | France | 43/17.1 |
| 1246311 | 8/1967 | Germany | 43/17.1 |

Primary Examiner—Kurt Rowan
Attorney, Agent, or Firm—Morton J. Rosenberg; David I. Klein

[57] ABSTRACT

An electric shock type fishing gear includes an artificial bait with two treble hooks, a booster circuit having two opposite ends respectively connected to the treble hooks by high-tension cables, a sliding rod retained by a spring to hold a solenoid switch opened by means of a magnet thereon, wherein when the artificial bait is pulled by the fish being arrested, the sliding rod moves the magnet away from the solenoid switch causing it turned on, and therefore the booster circuit is triggered to send electricity of high voltage through the treble hooks to strike the fish.

5 Claims, 8 Drawing Sheets

5,406,734

ELECTRIC SHOCK TYPE FISHING GEAR

BACKGROUND OF THE INVENTION

The present invention relates to fishing gears, and relates more particularly to an electric shock type fishing gear which discharges electricity to strike the fish being arrested as the fish struggles with the treble hooks.

While fishing with a fishing tackle everyone wishes to catch big fishes. However, when a big fish is caught by the treble hook, it is not easy to pull it out of the water, and one may have to battle against the fish being caught for a long time in order to catch it up. While fighting against the fish, the fishing line or the treble hook may be broken by the fish, and the fish may escape.

SUMMARY OF THE INVENTION

The present invention has been accomplished under the aforesaid circumstances. It is therefore the principal object of the present invention to provide an electrode type fishing gear which discharges electricity to strike the fish being arrested as the fish struggles with the treble hooks. According to one embodiment of the present invention, the electric shock type fishing gear comprises an artificial bait with two treble hooks, a booster circuit having two opposite ends respectively connected to the treble hooks by high-tension cables, a sliding rod retained by a spring to hold a solenoid switch opened by means of a magnet thereon, wherein when the artificial bait is pulled by the fish being arrested, the sliding rod moves the magnet away from the solenoid switch causing it turned on, and therefore the booster circuit is triggered to send electricity of high voltage through the treble hooks to strike the fish. The booster circuit may be mounted either within the artificial bait of the fishing gear or the sinker thereof.

DETAILED DESCRIPTION OF THE PREFERRED EMBODIMENTS

Figure 1:
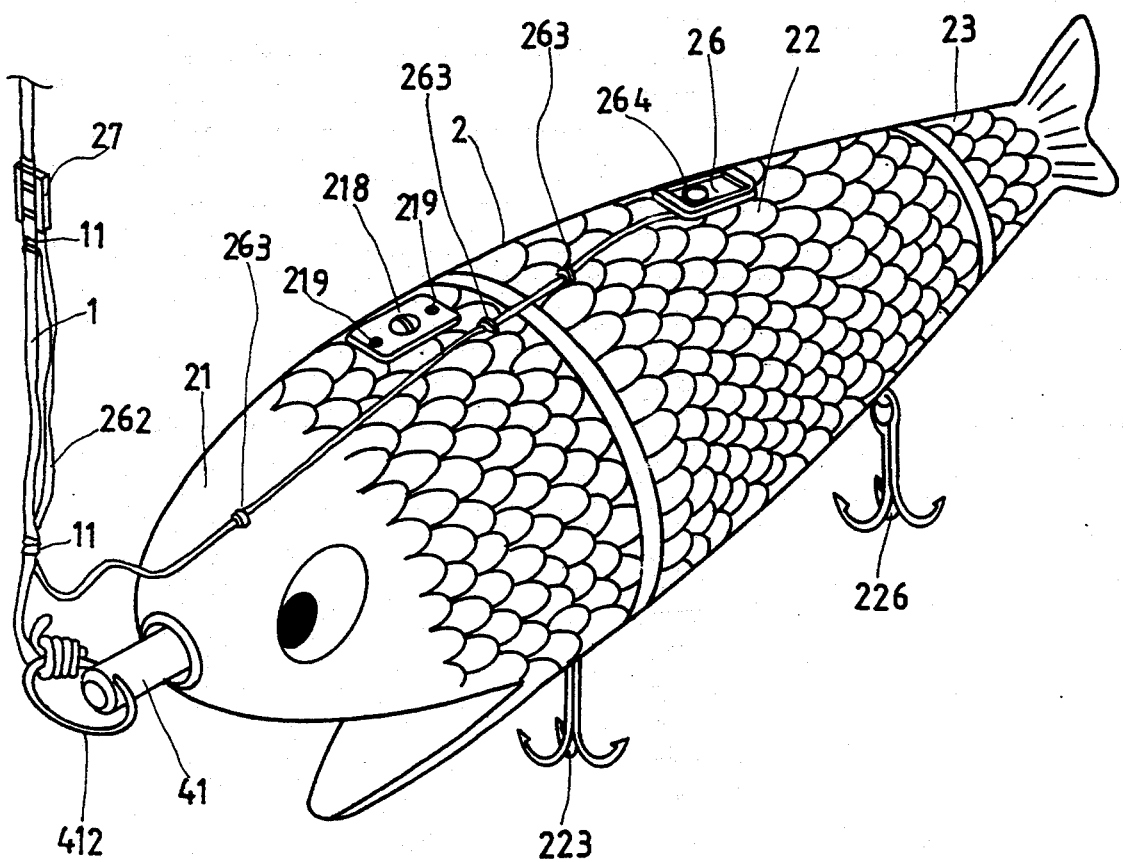
FIG. 1 is an elevational view of an electric shock type fishing gear according to a first embodiment of the present invention.
Figure 2:
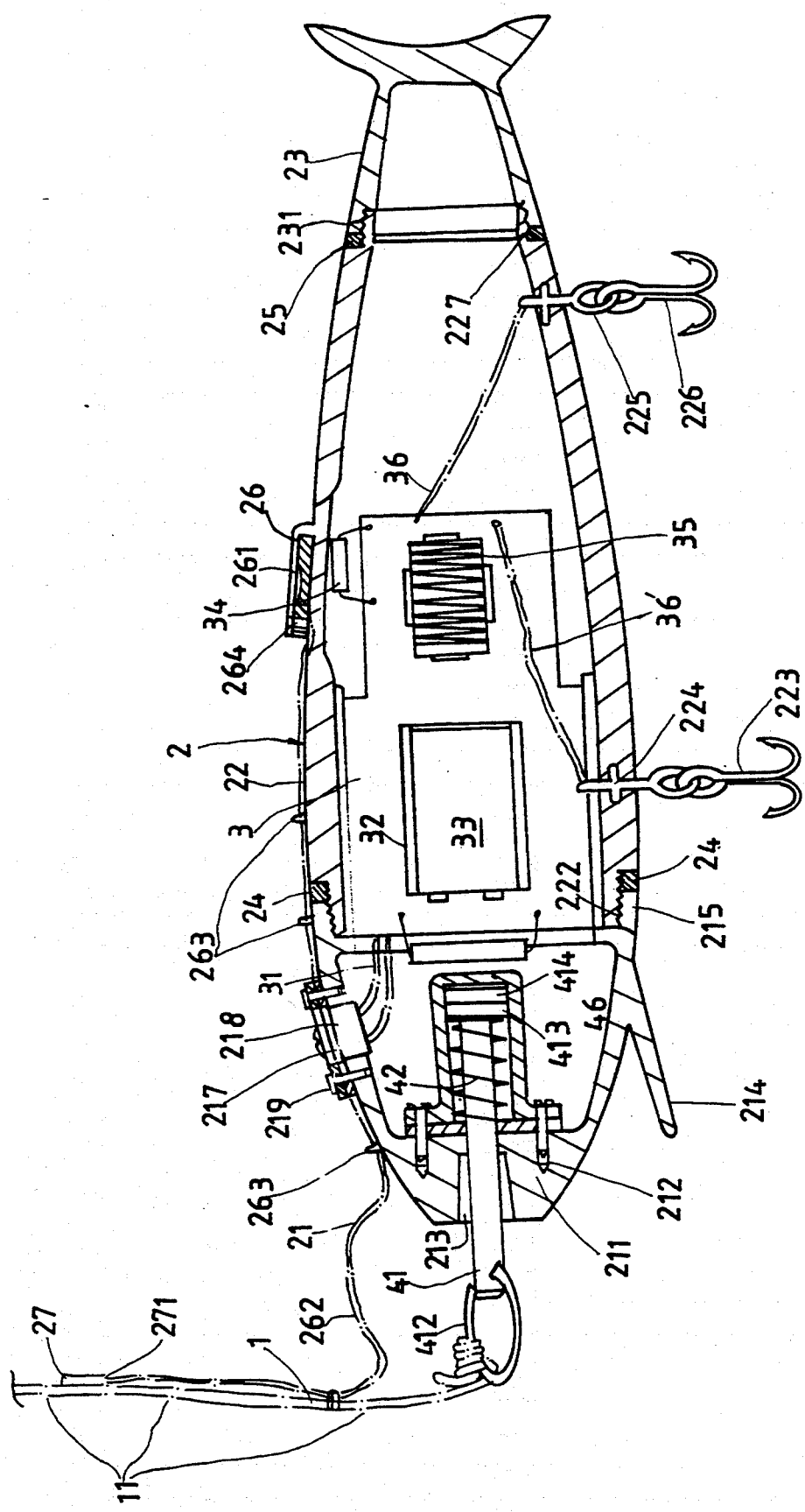
FIG. 2 is a longitudinal view in section of the electric shock type fishing gear shown in FIG. 1.
Figure 3:
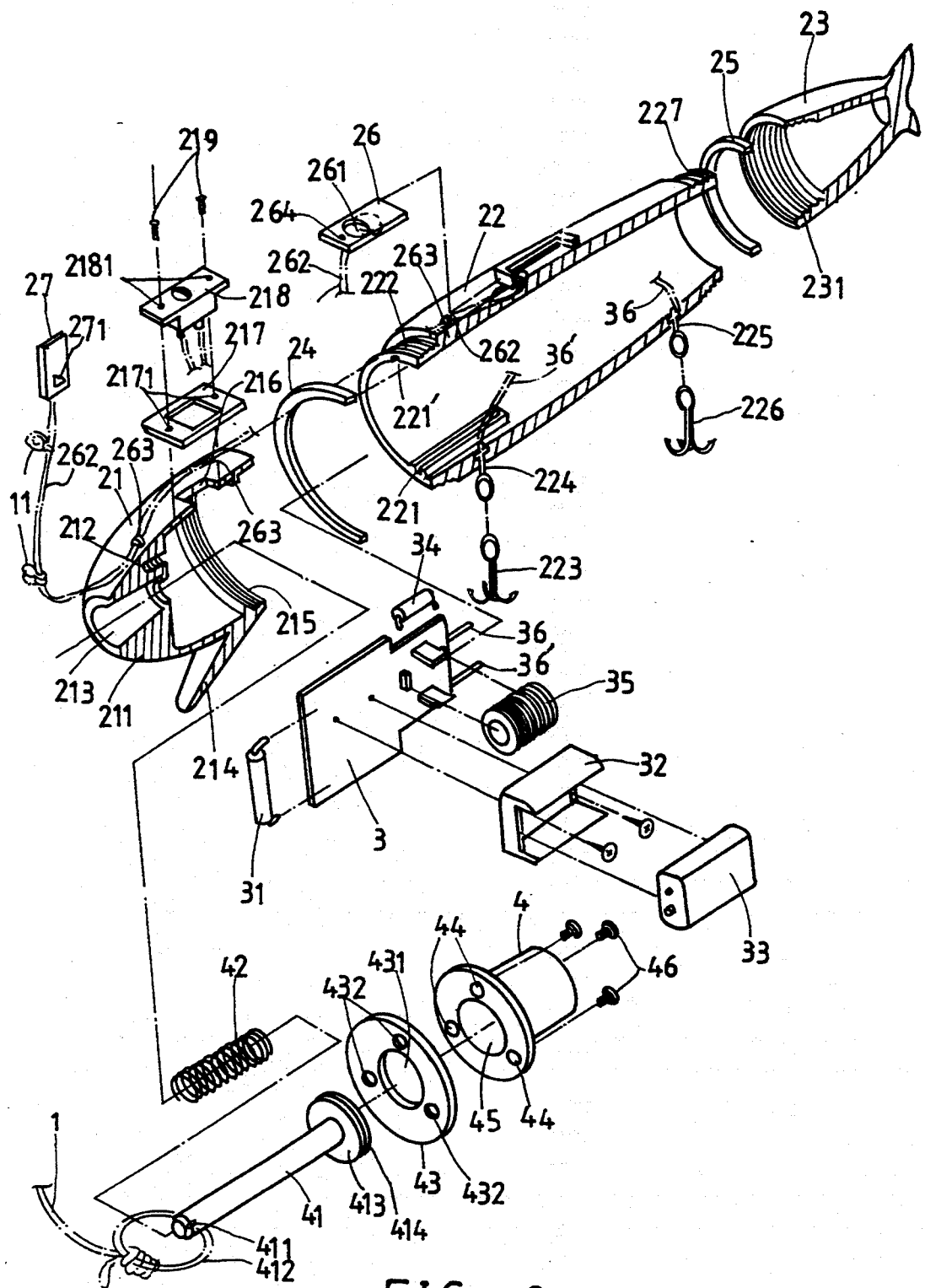
FIG. 3 is an exploded view of the electric shock type fishing gear shown in FIG. 1.

Referring to FIGS. 1, 2, and 3, the finishing line, referenced by 1, is fastened to a loop 412 on the sliding rod 41 of an artificial bait 2. A first treble hook 223 and a second treble hook 226 are respectively fastened to the artificial bait 2 at suitable locations. The artificial bait 2 is comprised of three parts, namely, the head 21, the body 22, and the tail 23. A mother board 3 is mounted on two opposite mounting grooves 221;221' within the body body 22 of the artificial bait 2, comprised of a first solenoid switch 31, a second solenoid switch 34, a battery box 32, a battery set 33, and a booster coil 35. The high-tension cables 36;36' are sleeved with a respective silicon rubber sleeve (not shown) to prevent leakage of electricity. A first metal hook hanger 224 and a second metal hook hanger 225 are integrally molded on the body 22 at suitable locations to hold the first treble hook 223 and the second treble hook 226 respectively. The high-tension cables 36;36' of the booster coil 35 are respectively connected to the first and second metal hook hangers 224;225. The front end of the body 22 is made with an outer thread 222 threaded into an inner thread 215 on the rear end of the head 21 and then sealed with a water seal ring 24. The rear end of the body 22 is also made with an outer thread 227 threaded into an inner thread 231 on the front end of the tail 23 and then sealed with a water seal ring 25. The head 21 comprises a front locating block 211 having a longitudinal through hole 213 and a plurality of screw holes 212 around the longitudinal through hole 213, and a projecting strip 214 obliquely projecting forward at the bottom. The projecting strip 214 can be used to pry open the mouth of the fish being arrested so that the treble hooks 223;226 can be conveniently removed from the fish. A top opening 216 is made on the head 21 at the top for mounting a water-proof pad 217 and a safety switch 218. By threading screws 219 through respective through holes 2181 on the safety switch 218 and respective through holes 2171 on the water-proof pad 217 into respective screw holes (not shown) on the head 21, the safety switch 218 and the water-proof pad 217 are fastened to the head 21. The safety switch 218 is for a safety control to prevent the discharge of electricity by an error. The safety switch 218 is switched on only when the electrode type fishing gear is in use. A casing 4 and a water-proof gasket 43 are respectively fastened to the front locating block 211 inside the head 21 to hold the sliding rod 41. By threading screws 46 through respective through holes 44 on the casing 4 and respective through holes 432 on the water-proof gasket 43 into the screw holes 212 on the front locating block 211, the casing 4 and the water-proof-gasket 43 are respectively fastened to the front locating block 211. The casing 4 has a front center hole 45 longitudinally aligned with the center hole 431 on the water-proof gasket 43 and the longitudinal through hole 213 on the front locating block 211 of the head 21. The sliding rod 41 is inserted through the longitudinal through hole 213 on the front locating block 211 and the center hole 431 on the water-proof gasket 43, having a stop block 413 on the rear end thereof retained within the casing 4 behind the water-proof gasket 43 and fastened with a magnet 414 at the back, and a tie hole 411 on the front end thereof extended out of the head 21 to hold the loop 412. A spring 42 is mounted around the sliding rod 41 and retained between the stop block 413 and the water-proof gasket 43. The spring 42 gives a backward pressure to the stop block 413, causing the magnet 414 to touch the bottom of the casing 4, and therefore the first solenoid switch 31 which is disposed near the casing 4 is maintained off. As the fish being arrested tries to escape, the artificial bait 2 will be pulled backwards relative to the sliding rod 41, causing the magnet 414 to move away from the bottom of the casing 4. As the magnet 414 moves away, the first solenoid switch 31 is released from the magnetic force of the magnet 414, and therefore it is caused to switch on. As the first solenoid switch 31 is turned from OFF state to ON state, the booster coil 35 is activated to send electricity of high voltage through the high tension cables 36;36', the metal hook hangers 224;225, and the treble hooks 223;226, to strike the fish being arrested, causing the fish to fall in a dead faint. Therefore, the fish being arrested can be smoothly seized.

A remote controller may be provided to control the operation of the mother board 3 from a distance, so as to prevent electric shocks. As using a remote controller to control the switching of an electric circuit can be easily achieved by conventional techniques, it is not necessary to describe such a remote controller in detail.

The second solenoid switch 34 is mounted on the mother board 3 at a suitable location. A slide switch 26 is made to slide on the body 22 above the second solenoid switch 34, having a magnet 261 carried thereon. There is provided a pull rope 262 having one end fastened to a tie hole 264 on the slide switch 26 and an opposite end inserted through a series of locating rings 263 on the body 22 and the head 21 and then fasten to the fishing line 1 by binders 11 and then connected to a tie hole 271 on a pull knob 27. By pulling the pull knob 27, the second solenoid switch 34 is controlled, namely, power supply to the booster coil 35 is stopped. By moving the slide switch 26 in the reversed direction, power supply to the booster coil 35 is electrically connected.

Figure 4:
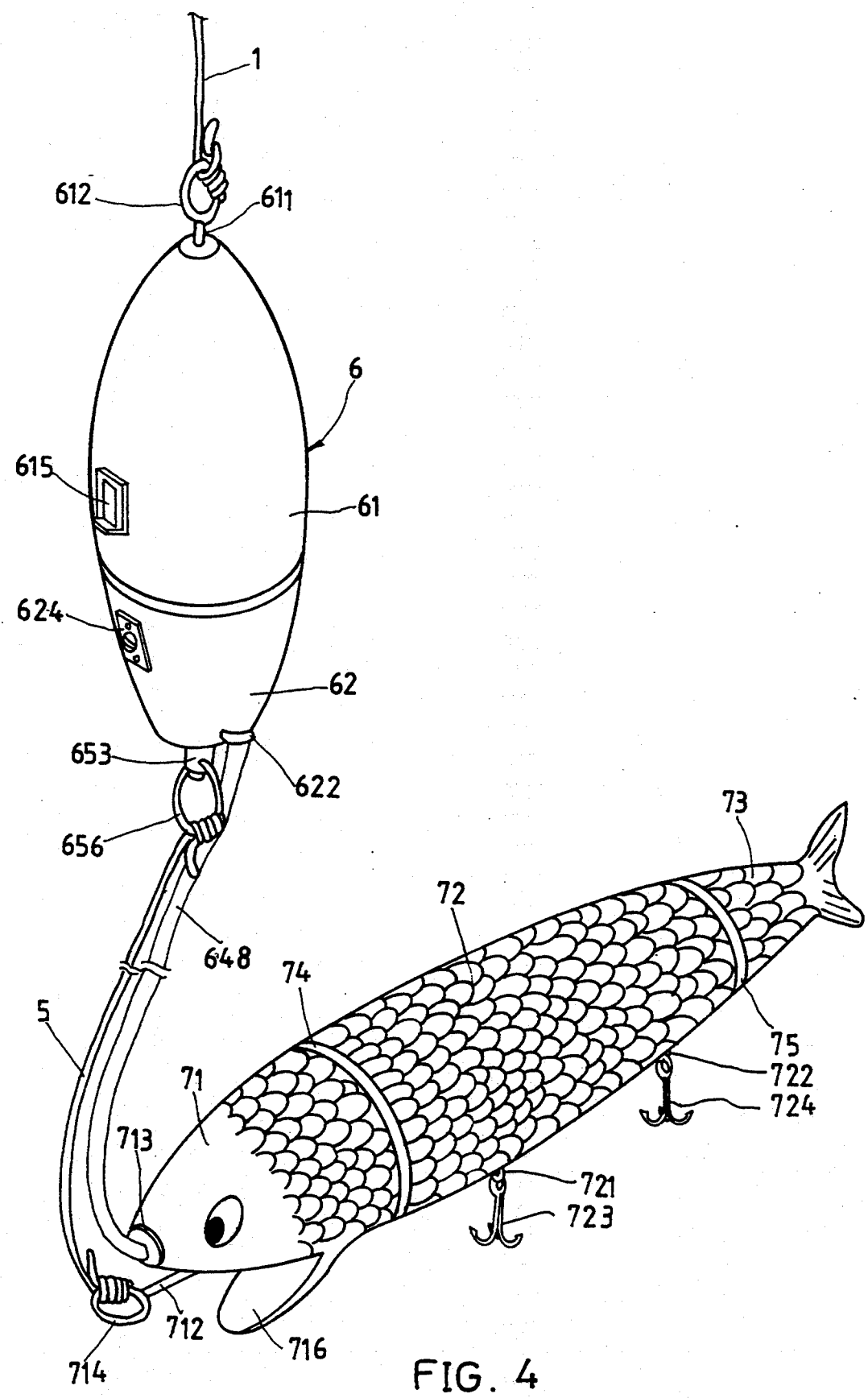
FIG. 4 is an elevational view of an electric shock type fishing gear according to a second embodiment of the present invention.
Figure 5:
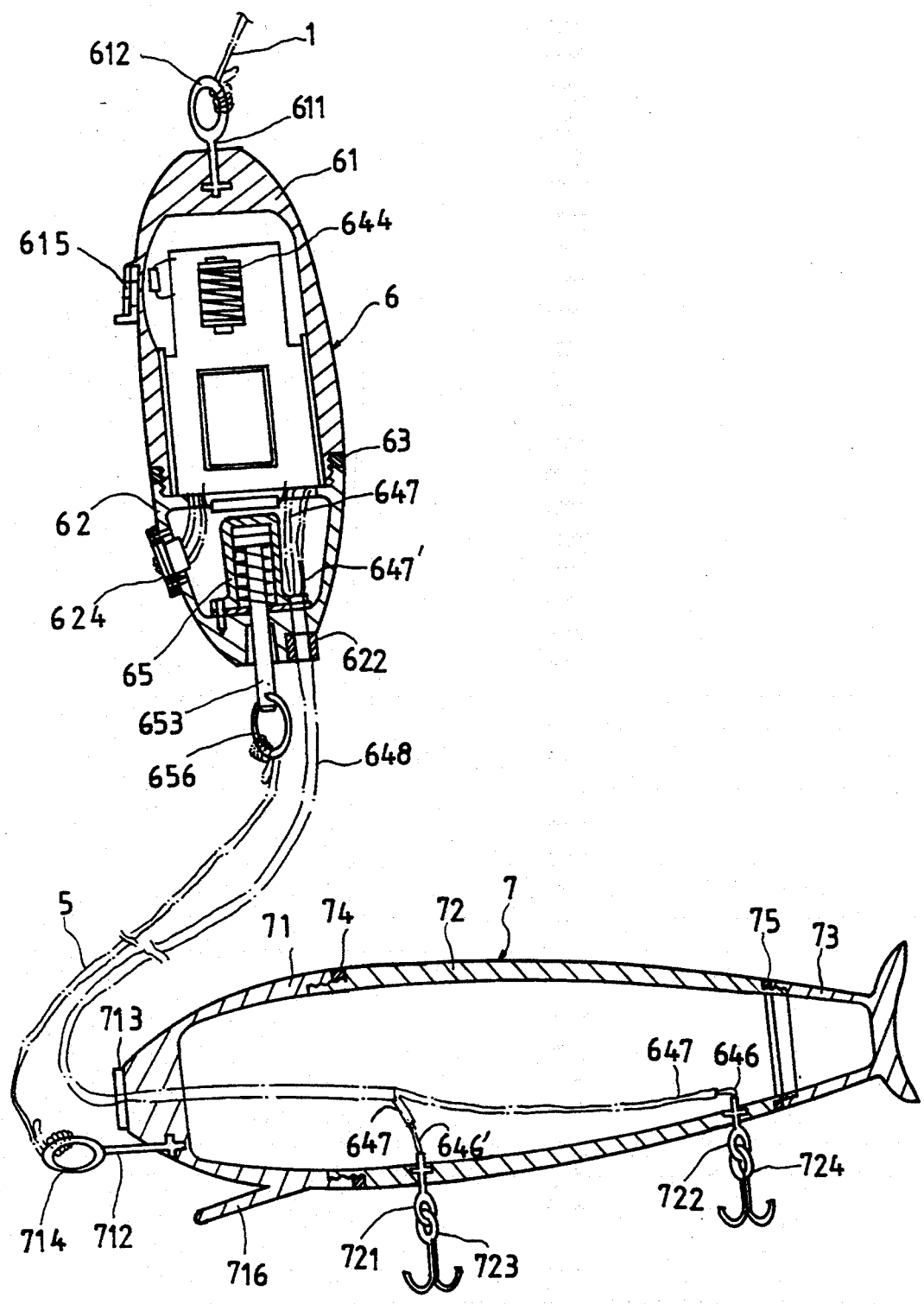
FIG. 5 is a longitudinal view in section of the electric shock type fishing gear shown in FIG. 4.
Figure 6:
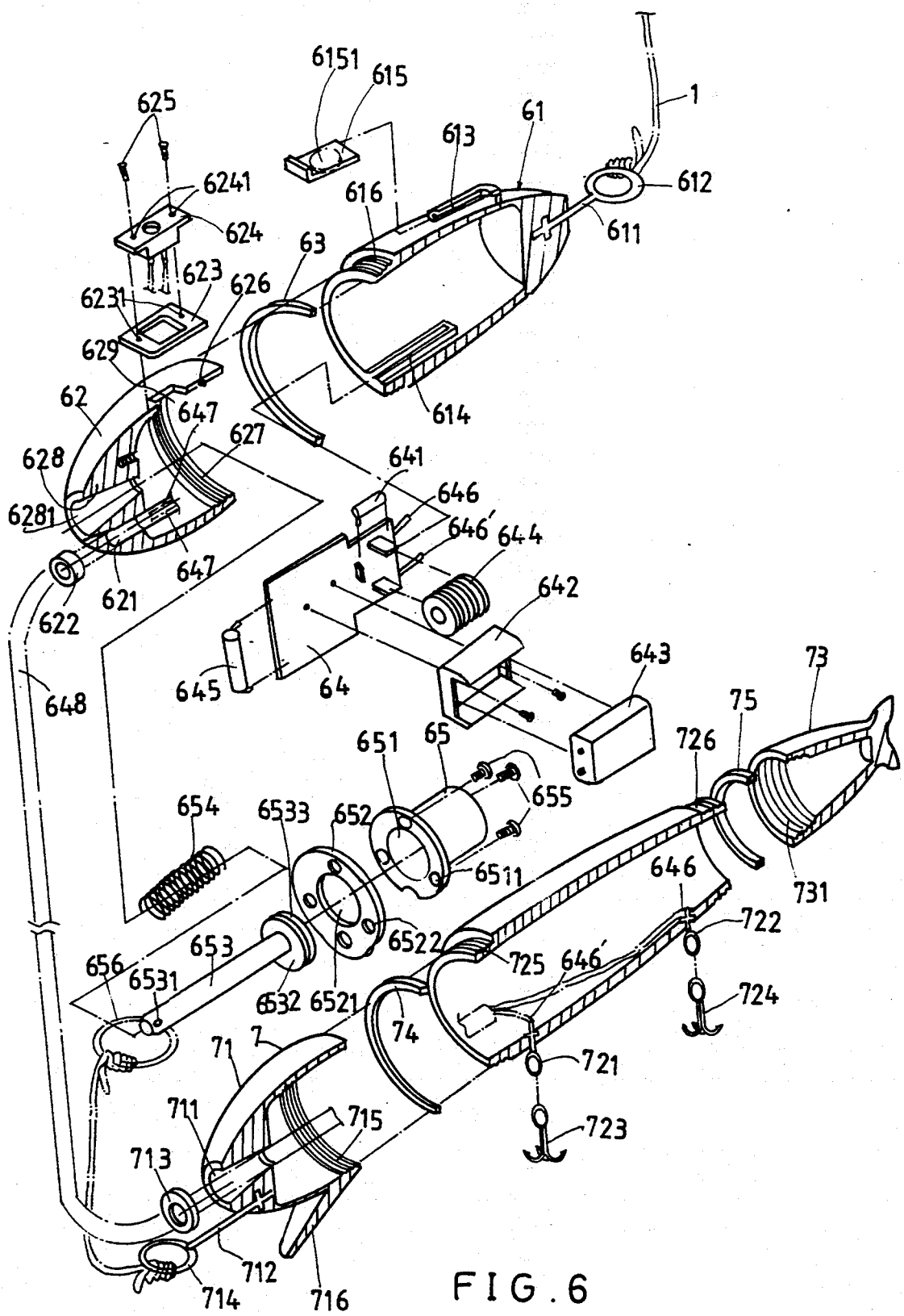
FIG. 6 is an exploded view of the electric shock type fishing gear shown in FIG. 4.

Referring to FIGS. 4, 5, and 6, therein illustrated is an alternate form of the present invention. The sinker 6 is comprised of two parts, namely, the front half 61 and the rear half 62. The front half 61 comprises a locating rod 611 having a fishing line hanger 612 at the front, to which the fishing line 1 is fastened. The rear half 62 comprises a top opening 629 for mounting a water-proof pad 623 and a safety switch 624. By threading screws 625 through respective through holes 6241 on the safety switch 624 and respective through holes 6231 on the water-proof pad 623 into respective screw holes (not shown) on the rear half 62 the safety switch 624 and the water-proof pad 623 are fastened to the rear half 62. The front half 61 has an outer thread 616 around the rear end thereof threaded into an inner thread 627 on the rear half 62 and then sealed with a water seal ring 63. A mother board 64 is mounted on two opposite mounting grooves 614 within the front half 61 of the sinker 6, having a first solenoid switch 641 disposed at the top and controlled by a magnet 6151 on a slide switch 615 being mounted on a sliding way 613 on the front half 61. The mother board 64 further comprises a second solenoid switch 645, a battery box 64 to hold a battery set 643, and a booster coil 644. The high-tension cables 646;646' are sleeved with respective silicon sleeves 647;647' within a silicon rubber tube 648. The silicon rubber tube 648 is inserted through a through hole 621 on the rear half 62 and a water seal ring 622 and then inserted through a water seal ring 713 within a through hole 711 on the head 71 of an artificial bait 7 for permitting the high-tension cables 646;646' to be respectively connected to a first metal hook hanger 721 and a second metal hook hanger 722 so that electricity can be discharged through a first treble hook 723 and a second treble hook 724. A casing 65 and a water-proof gasket 652 are respectively fastened to a locating block 628 inside the rear half 62 to hold the sliding rod 653. By threading screws 655 through respective through holes 6511 on the casing 65 and respective through holes 6522 on the water-proof gasket 652 into respective screw holes (not shown) on the locating block 628, the casing 65 and the water-proof-gasket 652 are respectively fastened to the locating block 628. The casing 65 has a front center hole 651 longitudinally aligned with the center hole 6521 on the water-proof gasket 652 and the longitudinal through hole 6281 on the locating block 628 of the rear half 62. The sliding rod 653 is inserted through the longitudinal through hole 6281 on the locating block 628 and the center hole 6521 on the water-proof gasket 652, having a stop block 6532 on the rear end thereof retained within the casing 65 behind the water-proof gasket 652 and fastened with a magnet 6533 at the back, and a tie hole 6531 on the front end thereof extended out of the rear half 62 to hold the loop 656. The head 71 of the artificial bait 7 comprises a locating rod 712 with a hanger 714 connected to the loop 656 on the sliding rod 653. A spring 654 is mounted around the sliding rod 653 and retained between the stop block 6532 and the water-proof gasket 652. The body 72 of the artificial bait 7 has an outer thread 725 around the front end thereof threaded into an inner thread 715 on the head 71 and then sealed with a water seal ring 74, and an outer thread 726 around the rear end thereof threaded into an inner thread 731 on the tail 73 and then sealed with a water seal ring 75. Further, the head 71 of the artificial bait 7 has a projecting strip 716 at the bottom, which can be used to pry open the mouth of the fish being arrested.

As the fish being arrested tries to escape, the artificial bait 7 will be pulled to drag the sliding rod 653, causing the magnet 6533 to move away from the bottom of the casing 65. As the magnet moved away, the second solenoid switch 645 is caused to turn from Off state to On state, and therefore the booster coil 644 is activated to send electricity of high voltage through the the treble hooks 723;724 via the high-tension cables 646;646'. When the fish is pulled on shore, the slide switch 615 is moved to switch off the first solenoid switch 614 so as to turn off power supply. As power supply is turned off, the projecting strip 716 is used to pry open the mouth of the fish so as to remove the treble hooks 723;724 from the mouth of the fish. When the device is not in use, the safety switch 624 is switched off to stop the operation of the mother board 64.

Figure 7:
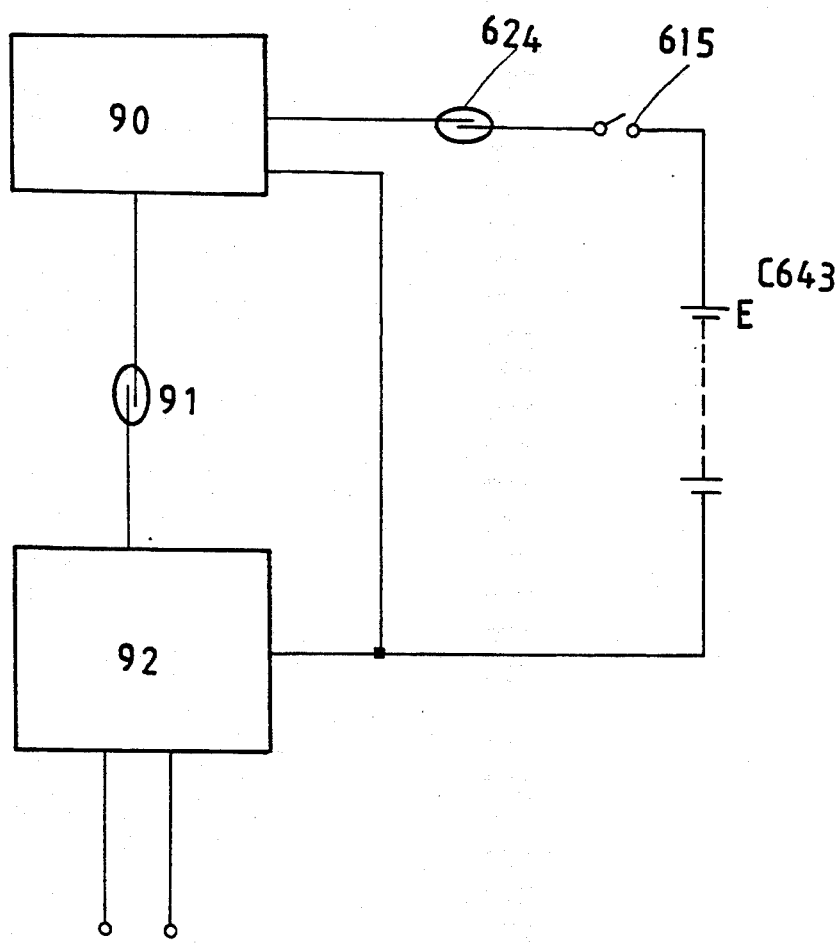
FIG. 7 is a control circuit diagram according to the present invention.
Figure 8:
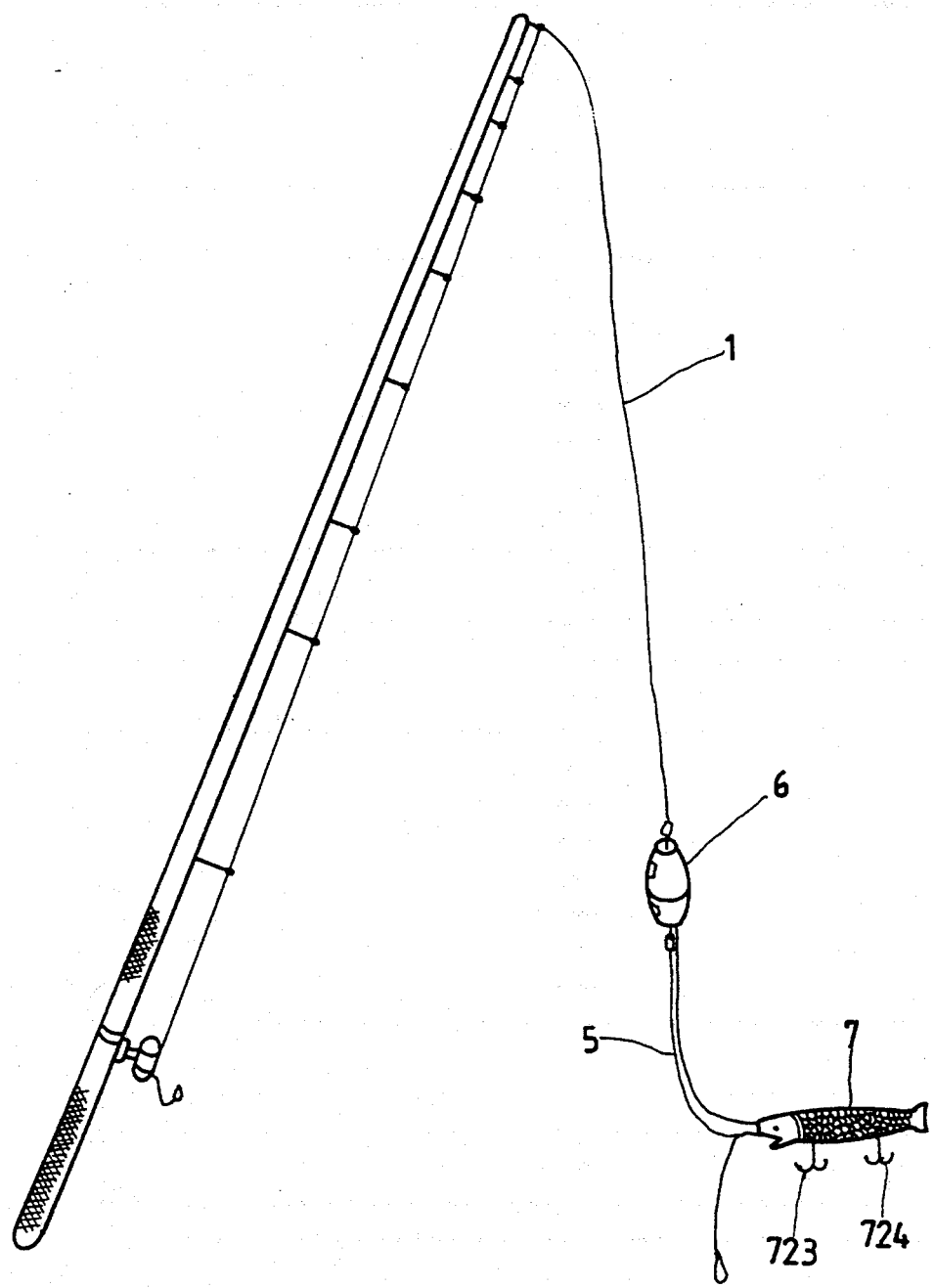
FIG. 8 is an installed view of the electric shock type fishing gear of FIG. 4.

Referring to FIG. 7, the battery set 643 is connected to the safety switch 624 via the slide switch 615, so as to control the pull switch 91 causing the high-tension circuit 90 to discharge high voltage. The reference 90 indicates a remote controller which controls the pull switch 91 from a distance. Therefore, the present invention can be controlled through a wired control as shown in FIGS. 4, 5, and 6, or through a wireless control as shown in FIGS. 1, 2, and 3.

What is claimed is:

1. An electric shock type fishing gear comprising a fishing line having an artificial bait connected thereto, said artificial bait comprising:
   a hollow head which comprises a front locating block, a rear open end, a longitudinal through hole through said front locating block, a projecting strip downwardly projecting forward, and a safety switch on the outside;
   a hollow tail which comprises an open front end;
   a hollow, cylindrical body which comprises a front open end fastened to the rear open end of said hollow head and sealed with a water sealing ring, a rear open end fastened to the front open end of said tail and sealed with a water sealing ring, two metal hook hangers spaced on the outside, two metal treble hooks respectively fastened to said metal hook hangers;

a mother board mounted within said body, said mother board comprising a first solenoid switch, a second solenoid switch, a battery box to hold a battery set, a remote control circuit, and a booster circuit having two opposite ends connected to said metal hook hangers by high-tension cables;

a control box mounted within said head and moved to control said first solenoid switch, said control box comprising a water-proof gasket fastened to said front locating block within said head, a cylindrical casing fastened to said water-proof gasket near said first solenoid switch, a sliding rod having an expanded rear end fastened with a magnet and retained within said cylindrical casing and said water-proof gasket and a front end extended out of said head through the longitudinal through hole on said front locating block and connected to the fishing line;

a slide switch fastened with a magnet and mounted on said body on the outside and moved to control said second solenoid switch; and wherein when the artificial bait is pulled by the fish being arrested, the magnet on said sliding rod is moved relative to said cylindrical casing causing said first solenoid switch switched on, and therefore said booster circuit is triggered to send electricity of high voltage through said metal hook hangers and said metal treble hooks to strike the fish.

2. The electric shock type fishing gear as recited in claim 1 including safety switch means for controlling power supply from said battery set to said booster circuit.

3. An electric shock type fishing gear comprising a fishing pole having a sinker and an artificial bait with metal treble hooks respectively connected to the fishing line thereof, said sinker comprising:

a hollow front half which comprises a front locating block, a rear open end, a longitudinal through hole through said front locating block, and a safety switch on the outside;

a hollow rear half having an open front end connected to the rear open end of said hollow front half and sealed with a water seal ring;

a mother board mounted within said hollow rear half, said mother board comprising a first solenoid switch, a second solenoid switch, a battery box to hold a battery set, and a booster circuit having two opposite ends connected the metal treble hooks on said artificial bait by high-tension cables;

a control box mounted within said hollow front half moved to control said first solenoid switch, said control box comprising a water-proof gasket fastened to said front locating block within said hollow front half, a cylindrical casing fastened to said waterproof gasket near said first solenoid switch, a sliding rod having an expanded rear end fastened with a magnet and retained within said cylindrical casing and said water-proof gasket and a front end extended out of said hollow front half through the longitudinal through hole on said front locating block and connected to said artificial bait by a link;

a slide switch fastened with a magnet and mounted on said hollow rear half on the outside and moved to control said second solenoid switch; and wherein when the artificial bait is pulled by the fish being arrested, the magnet on said sliding rod is moved relative to said cylindrical casing causing said first solenoid switch switched on, and therefore said booster circuit is triggered to send electricity of high voltage through said metal treble hooks to strike the fish.

4. The electric shock type fishing gear as recited in claim 3 including remote control circuit means for activating said booster circuit thereby passing electricity of high voltage through said treble hooks.

5. The electric shock type fishing gear as recited in claim 3 including safety switch means for controlling power supply from said battery set to said booster circuit.

* * * * *